(12) United States Patent
Jain

(10) Patent No.: US 7,660,004 B2
(45) Date of Patent: Feb. 9, 2010

(54) SYSTEM AND METHOD FOR DETECTING ACCIDENTAL OUTPUT TO A DEVICE

(75) Inventor: Anuj Jain, Raleigh, NC (US)

(73) Assignee: Oracle International Corporation, Redwood Shores, CA (US)

( * ) Notice: Subject to any disclaimer, the term of this patent is extended or adjusted under 35 U.S.C. 154(b) by 1437 days.

(21) Appl. No.: 10/780,367

(22) Filed: Feb. 17, 2004

(65) Prior Publication Data

US 2005/0179929 A1    Aug. 18, 2005

(51) Int. Cl.
*G06K 15/00* (2006.01)
*G06F 3/12* (2006.01)

(52) U.S. Cl. .................................. 358/1.14; 358/1.15

(58) Field of Classification Search ............... 358/1.15, 358/1.1, 1.2, 1.6, 1.9, 1.11, 1.13, 1.14, 1.16, 358/1.17, 1.18, 400, 401, 402, 407, 468, 358/437, 403; 347/2, 3, 5, 14, 23; 399/1, 399/8; 710/15, 62, 64, 72; 709/217, 218, 709/219; 380/55, 243; 713/1, 182; 715/700; 345/2.3; 455/3.01, 3.02, 3.03, 3.04, 3.05, 455/3.06
See application file for complete search history.

(56) References Cited

U.S. PATENT DOCUMENTS

| | | | | |
|---|---|---|---|---|
| 6,202,092 B1 * | 3/2001 | Takimoto | ..................... | 709/225 |
| 6,307,640 B1 * | 10/2001 | Motegi | ...................... | 358/1.14 |
| 7,321,435 B2 * | 1/2008 | Cherry et al. | .............. | 358/1.14 |
| 7,463,374 B2 * | 12/2008 | Corlett et al. | .............. | 358/1.14 |
| 2003/0206312 A1 * | 11/2003 | McAfee et al. | ............. | 358/1.15 |

* cited by examiner

*Primary Examiner*—Dov Popovici
(74) *Attorney, Agent, or Firm*—Townsend and Townsend and Crew LLP

(57) ABSTRACT

A system and method for detecting accidental data output to remote devices. In one set of embodiments a method for outputting information is provided, the method including accessing information associated with an application accessible from a first location and requesting output of the information to an electronic device. The method further includes determining a location of the electronic device, determining if the first location is remote to the location of the electronic device, and if the first location is remote to the location of the electronic device, preventing output of the information to the electronic device.

25 Claims, 7 Drawing Sheets

600

```
┌─────────────────────────────────────────────────┐
│ ACCESSING A REQUEST TO OUTPUT A DATA FILE ASSOCIATED │
│ WITH AN APPLICATION ACCESSIBLE FROM A FIRST ELECTRONIC│
│       DEVICE SITUATED AT A FIRST LOCATION.       │
│                      602                         │
└─────────────────────────────────────────────────┘
                        ↓
┌─────────────────────────────────────────────────┐
│  DETERMINING THAT THE REQUEST TARGETS A FIRST PRINTER. │
│                      604                         │
└─────────────────────────────────────────────────┘
                        ↓
┌─────────────────────────────────────────────────┐
│    DETERMINING A LOCATION ASSOCIATED WITH THE FIRST │
│                    PRINTER.                      │
│                      606                         │
└─────────────────────────────────────────────────┘
                        ↓
┌─────────────────────────────────────────────────┐
│  DETERMINING IF THE FIRST LOCATION IS REMOTE TO THE │
│             LOCATION OF THE PRINTER.             │
│                      608                         │
└─────────────────────────────────────────────────┘
                        ↓
┌─────────────────────────────────────────────────┐
│ FILTERING THE REQUEST IF THE FIRST LOCATION IS REMOTE TO │
│         THE LOCATION OF THE FIRST PRINTER.       │
│                      610                         │
└─────────────────────────────────────────────────┘
```

FIGURE 6

SYSTEM AND METHOD FOR DETECTING ACCIDENTAL OUTPUT TO A DEVICE

TECHNICAL FIELD

The field of the invention relates to electronic communications. More specifically, embodiments of the present invention relate to detecting accidental information output to an electronic device.

BACKGROUND ART

Applications such as word processors, web browsers and electronic mail software sometimes provide toolbars that generally comprise a print icon. The print icon is provided for the benefit of the user to efficiently make printouts of data (e.g., an electronic form of a document). Because many computers are portable, the default printer may be altered as a user changes location at which they work, e.g., from home, at the office, or at a remote office location. The print icon works as intended most of the time unless, either by mistake or purposely, the default printer is set to a remote printer (e.g., a printer not easily accessible from where the print job was requested).

In this case, if a print request is initiated by a print icon, the printout could be sent to the remote printer without warning. Printing to a remote printer unintentionally could result in a waste of paper and in some cases, could release confidential information to the remote location, which may or may not be secure.

For example, if a manager prints out confidential information about employees to a remote printer by mistake, bonus information, salary information or performance reviews could be released to unauthorized personnel.

To avoid situations like this, users must be extremely careful about printer assignments or users could remove the print icon from the toolbar. This however does not address the unsuspecting user or users who are temporarily working on an unfamiliar machine. Neither does this solution cover users who do not intend to print, but accidentally select the print icon by mistake. Furthermore, removing the print icon from the toolbar may not be possible for some users with limited computer knowledge.

DISCLOSURE OF THE INVENTION

A system and method for detecting accidental data output to a device would be an improvement over the art. Accordingly, a system and method for detecting accidental data output to a device are disclosed. Embodiments of the present invention include a method for outputting information comprising the steps of accessing information associated with an application that is accessible from a first location and requesting output of the information to an electronic device. The method further includes determining a location of the electronic device and determining if the first location is remote to the location of the electronic device. If the first location is remote to the location of the electronic device embodiments of the present invention perform optional tasks that are directed to preventing output of the information to the electronic device.

In one embodiment of the present invention, the electronic device is a printer. Upon detecting a print request to the remote printer, embodiments may perform one of several tasks. First, one embodiment may temporarily suspend printing and give the user a warning that the printer is remote. The print job would continue only if a user validation was received, otherwise the print job would be cancelled or rerouted to a local printer. In another embodiment of the invention, the process automatically alters the default printer to always be local to the user. In yet another embodiment, the process automatically disables printer icons that are remote to the user.

Additional embodiments of the invention also include a system for detecting information output to a remote device. The system includes a first electronic device at a first location and containing information to be outputted. The system further includes an application accessible from the first electronic device for requesting output of the information to a second electronic device at a second location. The system includes a location determiner in communication with the first electronic device and for determining if the first location is remote to the second location. A data output request filter is also included for filtering information output requests from the application if the first location is remote to the second location. The filter may perform any or all of the above described functions in response to a print request to a remote printer.

BRIEF DESCRIPTION OF THE DRAWINGS

The above and other objects and advantages of the present invention will be more readily appreciated from the following detailed description when read in conjunction with the accompanying drawings, wherein:

FIG. 6 is a flow diagram of an exemplary computer implemented method for printing in accordance with embodiments of the present invention.

DETAILED DESCRIPTION OF THE INVENTION

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents, which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions, which follow, are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention (e.g., process 500 and 600), discussions utilizing terms such as accessing, requesting, determining, preventing, modifying, filtering, outputting, generating or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
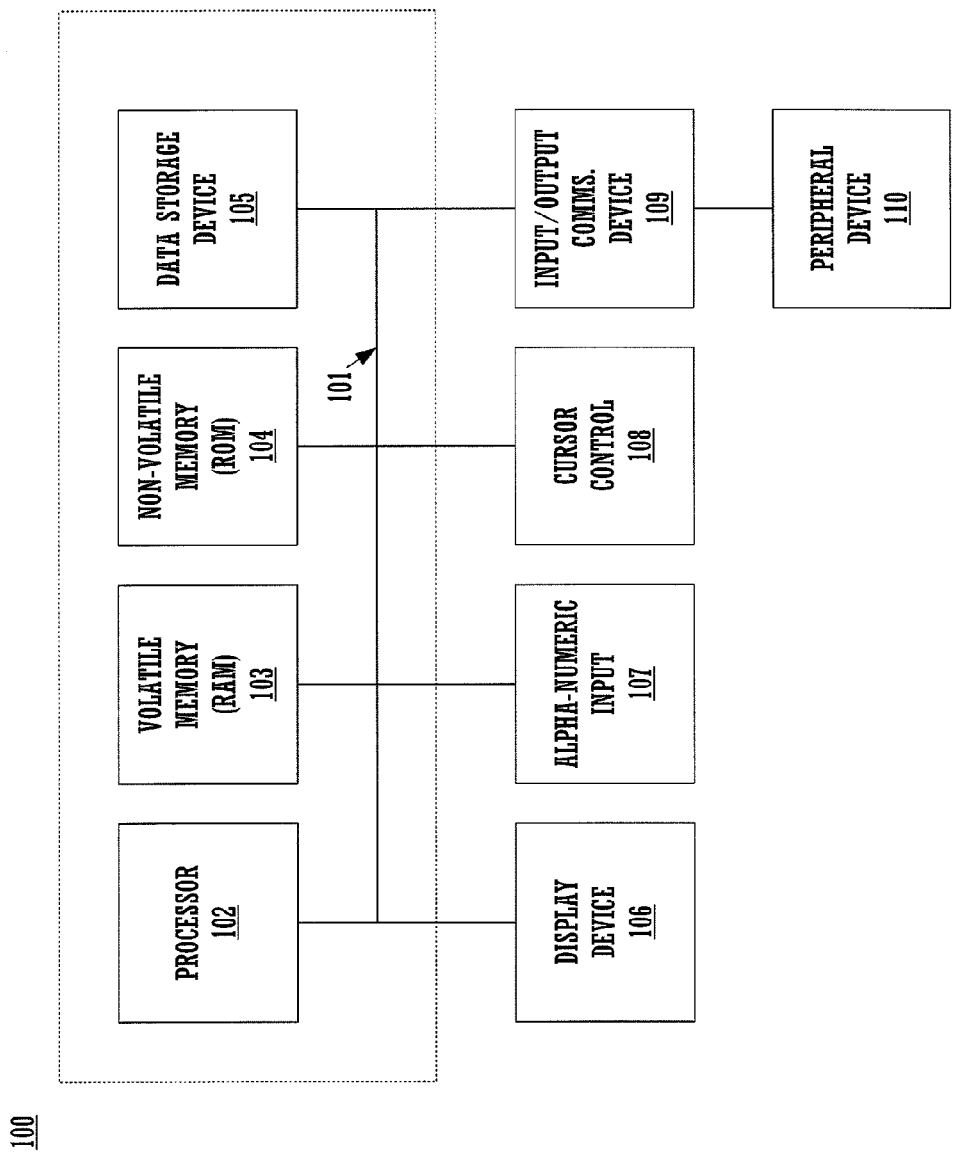
FIG. 1 is a block diagram of an exemplary computer system in accordance with embodiments of the present invention.

With reference to FIG. 1, portions of the present invention are comprised of computer-readable and computer-executable instructions that reside, for example, in computer system 100, which may be used as a part of a general-purpose computer network (not shown). It is appreciated that computer system 100 of FIG. 1 is exemplary only and that the present invention can operate within a number of different computer systems including general-purpose computer systems, embedded computer systems, laptop computer systems, hand-held computer systems, and stand-alone computer systems.

In the present embodiment, computer system 100 includes an address/data bus 101 for conveying digital information between the various components, a central processor unit (CPU) 102 for processing the digital information and instructions, a volatile main memory 103 comprised of volatile random access memory (RAM) for storing the digital information and instructions, and a non-volatile read only memory (ROM) 104 for storing information and instructions of a more permanent nature. In addition, computer system 100 may also include a data storage device 105 (e.g., a magnetic, optical, floppy, or tape drive or the like) for storing vast amounts of data. It should be noted that the software program for outputting information of the present invention can be stored either in volatile memory 103, data storage device 105, or in an external storage device (not shown).

Devices which are optionally coupled to computer system 100 include a display device 106 for displaying information to a computer user, an alpha-numeric input device 107 (e.g., a keyboard), and a cursor control device 108 (e.g., mouse, trackball, light pen, etc.) for inputting data, selections, updates, etc. Computer system 100 can also include a mechanism for emitting an audible signal (not shown).

Returning still to FIG. 1, optional display device 106 of FIG. 1 may be a liquid crystal device, cathode ray tube, or other display device suitable for creating graphic images and alphanumeric characters recognizable to a user. Optional cursor control device 108 allows the computer user to dynamically signal the two-dimensional movement of a visible symbol (cursor) on a display screen of display device 106. Many implementations of cursor control device 108 are known in the art including a trackball, mouse, touch pad, joystick, or special keys on alphanumeric input 107 capable of signaling movement of a given direction or manner displacement. Alternatively, it will be appreciated that a cursor can be directed an/or activated via input from alphanumeric input 107 using special keys and key sequence commands. Alternatively, the cursor may be directed and/or activated via input from a number of specially adapted cursor directing devices.

Furthermore, computer system 100 can include an input/output (I/O) signal unit (e.g., interface) 109 for interfacing with a peripheral device 110 (e.g., a printer, a computer network, modem, mass storage device, etc.). Accordingly, computer system 100 may be coupled in a network, such as a client/server environment, whereby a number of clients (e.g., personal computers, workstations, portable computers, minicomputers, terminals, etc.) are used to run processes for performing desired tasks (e.g., printing, outputting information, etc.).

Filtering Information Outputs

Figure 2:
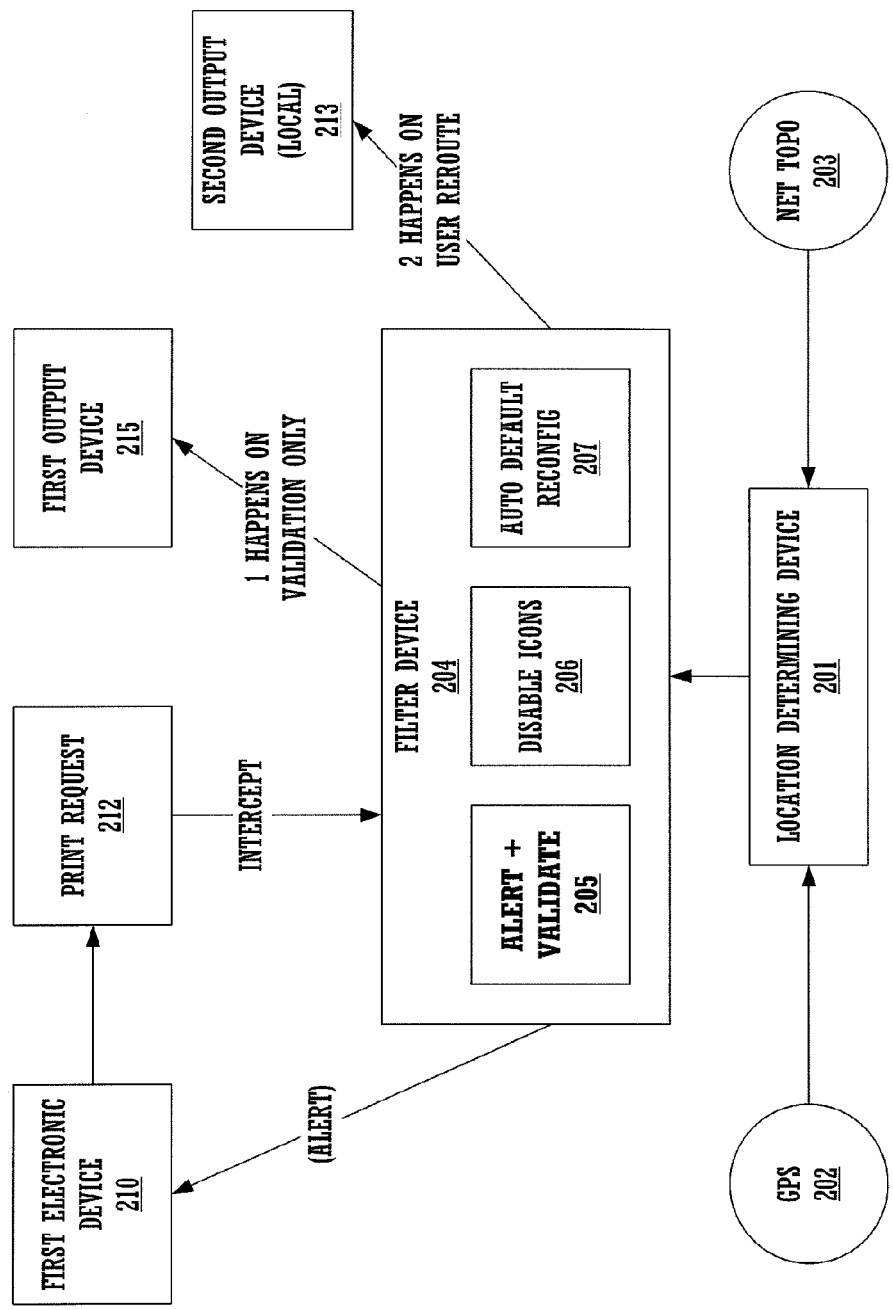
FIG. 2 is a data flow diagram of an exemplary system for alerting and validating a request to output information to a remote device in accordance with embodiments of the present invention.

FIG. 2 is a data flow diagram of an exemplary system for alerting and validating a request to output information to a remote device in accordance with embodiments of the present invention. In one embodiment of the present invention, an information output request (e.g., print request) is intercepted by a filter device to determine if the target output device (e.g., printer) is remote to the device the request was initiated from. The filter device may be a software module located on the first electronic device 210. For example, the first electronic device 210 (e.g., laptop computer) makes a print request 212 from an application (e.g., word processor, email application, web browser, etc.) accessible from the first electronic device 210. Then, filter device 204 intercepts the print request 212.

A location-determining device 201 in communication with the filter device 204 determines the location of the first output device 215 (e.g., printer). The location-determining device can use data from a global positioning satellite (GPS) device 202 or from a network topography device 203 or from any well-known method of determining position, to determine the location of the first output device. In one embodiment of the invention, the location-determining device 201 can determine the location of the first electronic device 210, the first output device 215 and the second output device 213. The details of determining locations from GPS information and network topography information are well known in the art and any can be employed with the embodiments of the present invention.

In one embodiment of the present invention, the filter device 204 also comprises a disable icons portion 206 and an automatic default settings reconfigurer 207. The details of these features will be discussed along with FIG. 3 and FIG. 4.

In one embodiment of the invention, when an information output request is intercepted by the filter 204 and the first output device 215 is determined to be remote, a user alert is generated to alert that they are about to output information to a remote device. The user then has the option to validate (e.g., accept) the output request before it is performed to cancel the request, or to select another printer. Alerting the user that an output to a remote device has been requested advantageously prevents accidental output of sensitive information to a remote location. In addition, avoiding information output to a remote device prevents wasting paper when, for example, the remote device is a printer.

If the user does not wish to output the information to the remote device, a second output device 213 (e.g., one that is local) can be selected. In one embodiment of the invention, when selecting a second output device 213, only local output devices are selectable (e.g., icons and menu options associated with local devices are selectable).

Figure 3:
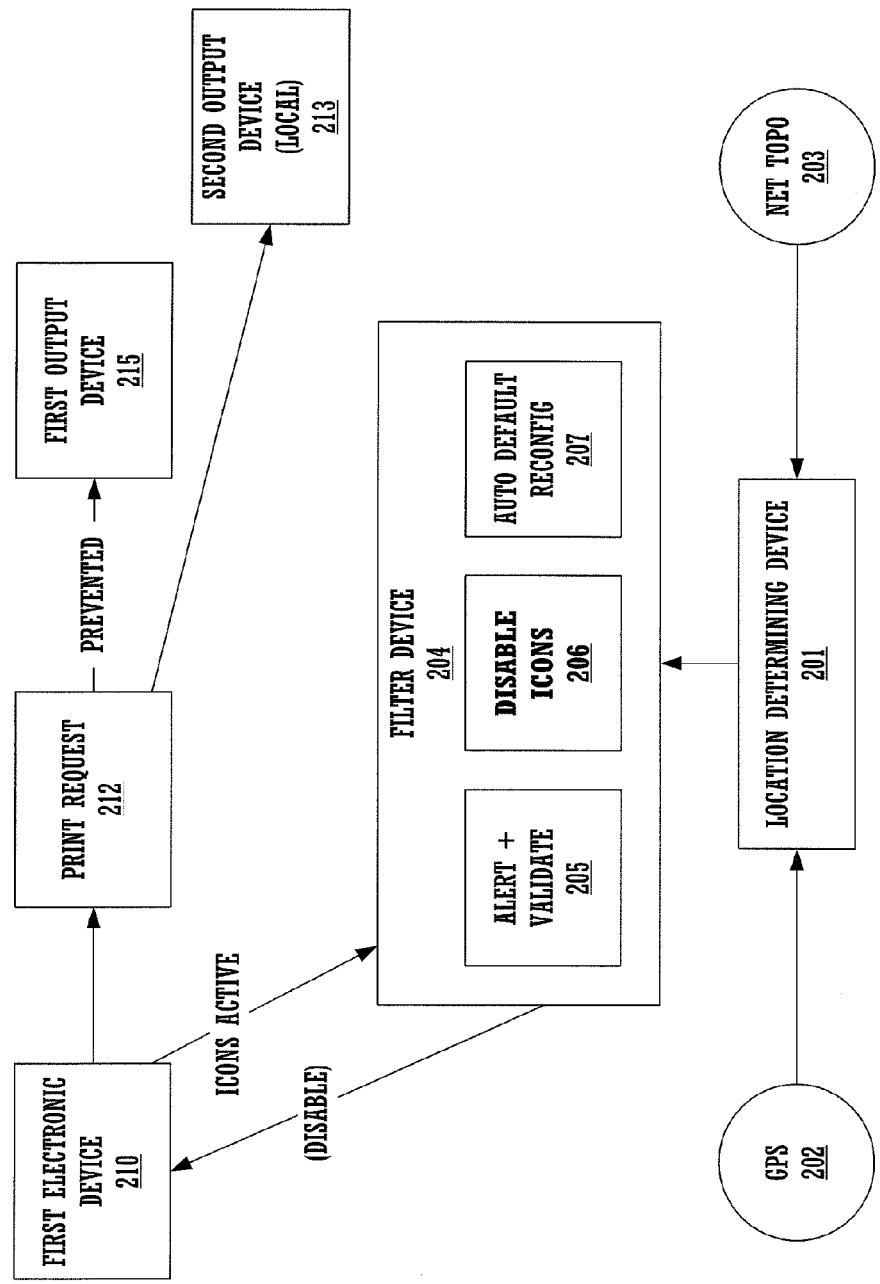
FIG. 3 is a data flow diagram of an exemplary system for disabling icons when requesting to output information to a remote device in accordance with embodiments of the present invention.

FIG. 3 is a data flow diagram of an exemplary system for disabling icons when requesting to output information to a remote device in accordance with embodiments of the present invention. In another embodiment of the invention, the filter device 204 disables icons associated with remote devices to prevent output of information to those devices. In this embodiment, the disable icons portion 206 of the filter device 204 is responsible for disabling remote device icons associated with remote devices. For example, a location of a first electronic device 210 is determined by the location-determining device 201. As stated above, the location-determining device 201 can use GPS information 202 or network topography information 203 to determine the location of the first electronic device. It is appreciated that the location determining device 201 can use any location determining system or information to determine the location of the first electronic device, the first output device or any other device in communication with the filter device 204.

In this embodiment of the invention, after the location of the first electronic device is determined, the filter device 204 automatically filters the active icons accessible from the first electronic device. In one embodiment of the invention, the first electronic device accesses a resource (e.g., application) over a network (e.g., LAN, Internet, Intranet, etc.). For example, the application could be a web-based application that is running on a remote computer system. The filter 204 automatically disables icons and menu options (e.g., drop down menu options, command line options, etc.) that are associated with devices that are remote to the first electronic device 210, thus preventing access to a remote device. In one embodiment of the invention, the user has the option to disable this feature. In this embodiment, a user alert will be generated when a remote device icon is selected.

The filter device 204 retrieves information from the location-determining device 201 to determine what icons are associated with devices that are remote to the first electronic device 210. The disable icons portion 206 of the filter device 204 disables the icons that are associated with devices that are remote to the first electronic device 210. Disabling the icons associated with devices that are remote to the first electronic device prevents accidental output of information to remote devices, for example, selecting a print icon for a remote printer location information is updated periodically for designating remote and local print icons. In this embodiment of the invention, the local device icons are still selectable and a second output device 213 that is local to the first electronic device 210 can be selected. In one embodiment of the invention, the print icon is disabled when the default printer or the printer selected for subsequent printing is a remote printer.

Figure 4:
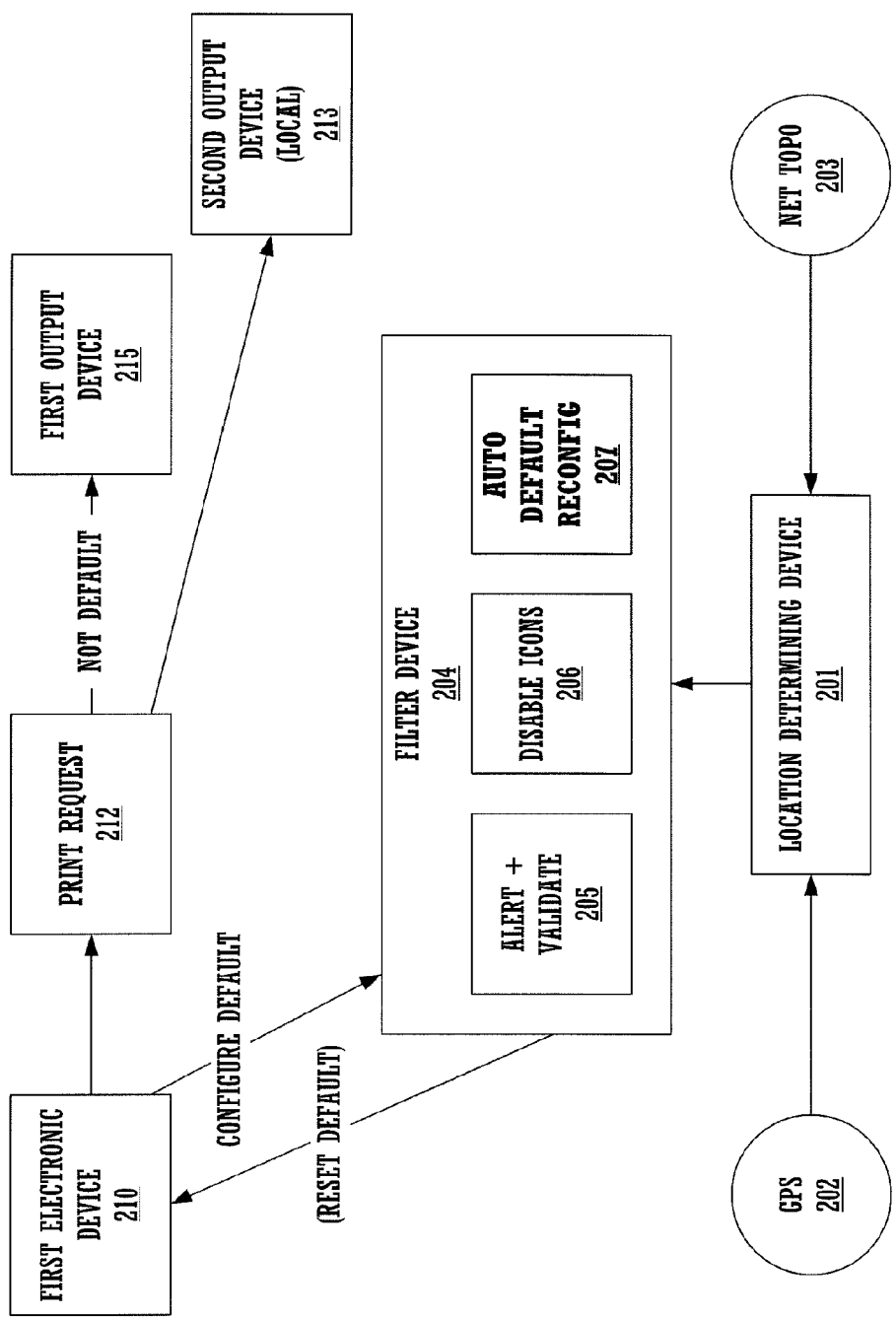
FIG. 4 is a data flow diagram of an exemplary system for automatically reconfiguring default settings of a local computer system when requesting to output information to a remote device in accordance with embodiments of the present invention.

FIG. 4 is a data flow diagram of an exemplary system for automatically reconfiguring default settings of a local computer system when requesting to output information to a remote device in accordance with embodiments of the present invention. In this embodiment of the invention, the default setting auto reconfigurer 207 of the filter device 204 automatically reconfigures default settings of the application and/or first electronic device 210 when the filter device 204 filters a request to output information to a remote device. If the default output device 215 is remote to the first electronic device 210, the auto default reconfigurer 207 will automatically reconfigure the default settings such that a second output device 213 (local to the first electronic device 210) will be the default output device and associated with the default print icon.

In another embodiment of the invention, when the location of the first electronic device 210 changes, the auto default reconfigurer will automatically modify the default output device such that it is local to the first electronic device 210 at the new location.

Figure 5:
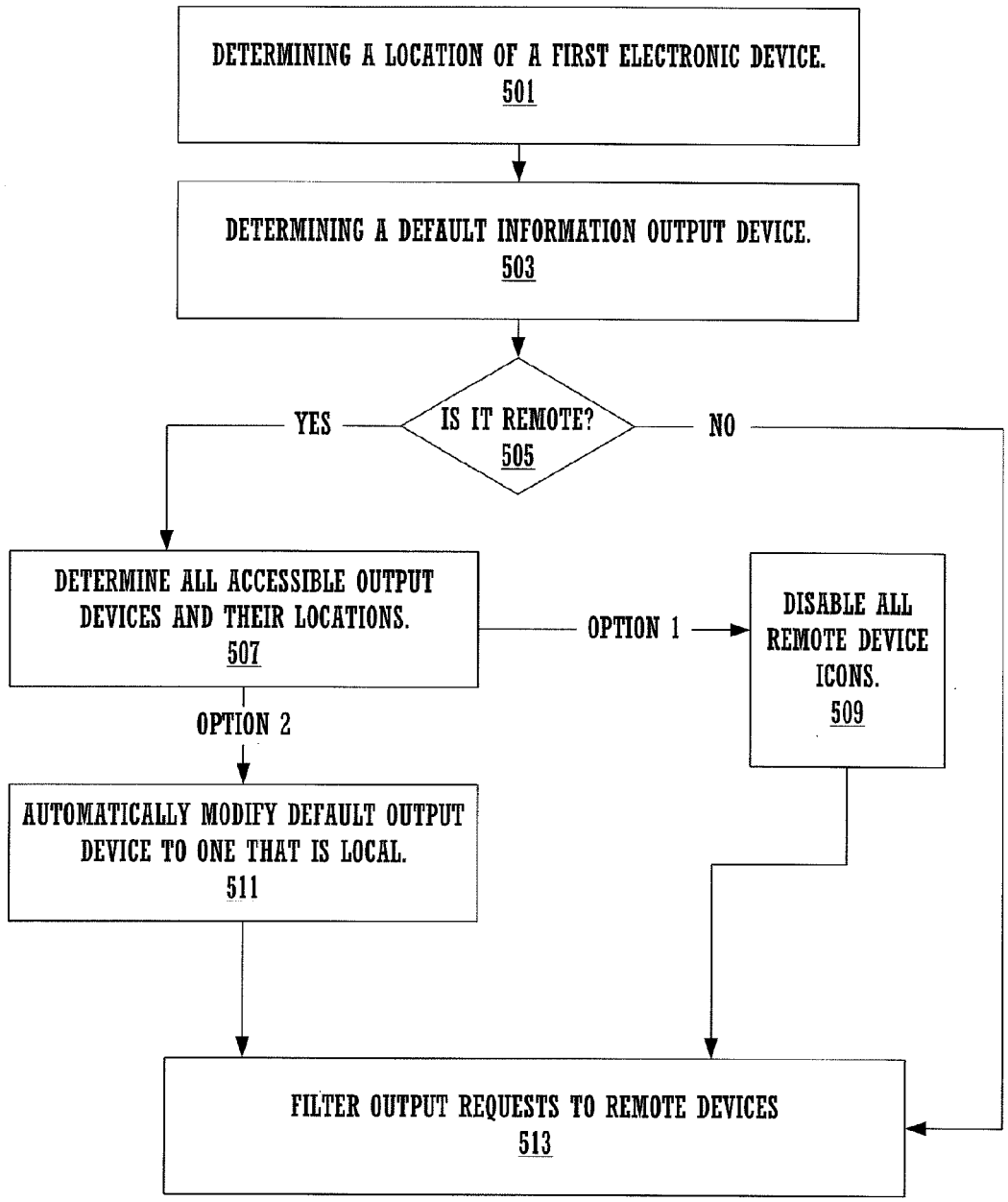
FIG. 5 is a flow diagram of an exemplary computer implemented method for outputting information in accordance with embodiments of the present invention.

FIG. 5 is a flow diagram of an exemplary computer implemented process 500 for outputting information in accordance with embodiments of the present invention. Step 501 includes determining a location of a first electronic device. For example, determining that the electronic device a user is working on is a computer system located at their home.

Step 503 includes determining a default information output device. For example, in the case the information output device is a printer, determining a default printer. In another embodiment of the invention, the information output device is a portable electronic device such as a personal digital assistant (PDA).

Step 505 includes determining a location of the default information output device. As stated above, GPS information or network topography information can be used to determine the location of the electronic device and the computer system the information output request came from. The location information of the default printer can be compared to the location of the first electronic device to determine if it is remote to the first electronic device.

If the default information output device is remote, step 507 includes determining all accessible output devices and the locations of the accessible information output devices. In one embodiment of the invention, any information output device that has been installed onto the first electronic device is examined. If a location cannot be determined for an output device, the will be automatically disabled.

Option one includes step 509, which includes disabling all icons associated with remote devices. Option one corresponds to the description of the embodiment illustrated in FIG. 3 above. After disabling the icons of remote devices, or if the default information output device is not remote to the first electronic device, process 500 further includes step 513 filtering output requests to remote devices. Step 513 corresponds to the description of the embodiment illustrated in FIG. 2 above. In one embodiment of the invention, the filtering output step includes generating a user alert to warn that information output to a remote device has been requested. In this embodiment of the invention, the user has the option to validate the request (e.g., accept the request) before the request is processed. Validating the request prevents accidental output of information to a remote location.

Option two includes step 511, which includes automatically modifying the default information output device to one that is local to the first electronic device. For example, when working at home, the default information output device (e.g., printer) will be automatically modified to a printer at the home. Furthermore, in the case of a laptop, when transported back to the office, the default printer will be automatically modifies to a printer at the office. Step 511 corresponds to the embodiment illustrated in FIG. 4 above. Process 500 then proceeds to step 513, as described above.

FIG. 6 is a flow diagram of an exemplary computer implemented method 600 for printing in accordance with embodiments of the present invention. Step 602 comprises accessing a request to output a data file associated with an application accessible from a first electronic device situated at a first location. For example, from a home computer, requesting to print a document from a word processing application.

Step 604 includes determining that the request targets a first printer. In one embodiment of the invention, a default printer is determined.

Step 606 includes determining a location associated with the first printer. In one embodiment of the invention, GPS data is used to determine the location of the first printer with respect to the first electronic device where the print request originated.

Step 608 includes determining if the first location is remote to the location of the printer. In one embodiment of the invention, a location-determining device is responsible for determining if the first location is remote to the location of the first printer.

Step 610 includes filtering the request if the first location is remote to the location of the first printer. In one embodiment, the filtering includes disabling print icons and print menu options associated with remote printers as displayed of the first electronic device. In another embodiment of the invention, the filtering includes modifying default print settings of the first electronic device such that the print request is routed to a second printer that is not remote (e.g., local) to the first electronic device.

Additional embodiments of process 600 include generating a user alert in response to filtering a request to print to a remote location. In this embodiment of the invention, the user has the option to validate the print request. Validating the print request prevents accidental printing to a remote location. In another embodiment of the invention, process 600 further includes determining if the data file is sensitive. In this embodiment of the invention, the filtering comprises preventing output of sensitive data files only.

Figure 7:
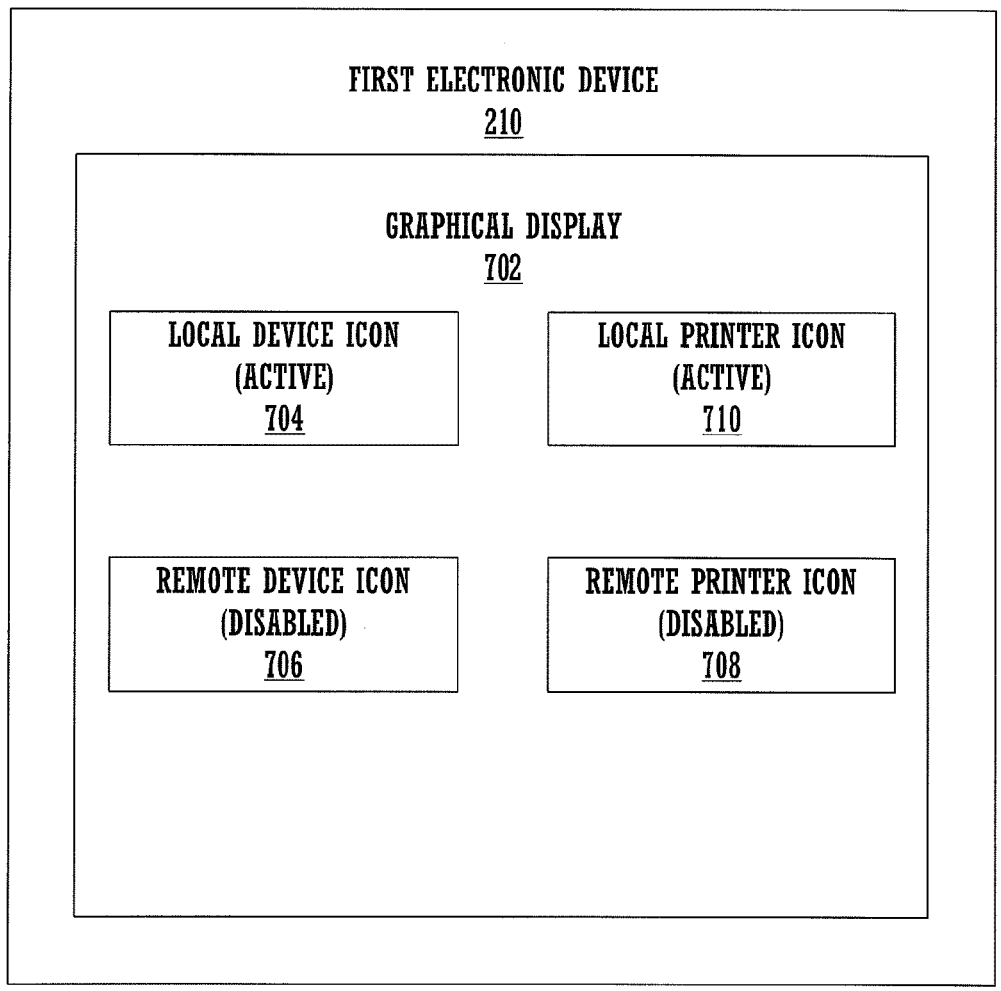
FIG. 7 is an illustration of an exemplary graphical display wherein icons of remote devices are disabled in accordance with embodiments of the present invention.

FIG. 7 is an illustration of an exemplary graphical display wherein icons of remote devices are disabled in accordance with embodiments of the present invention. FIG. 7 illustrates a graphical display 702 of a first electronic device 210. Graphical display 702 comprises local device icon 704 and local printer icon 710 that are active. Also included are remote device icon 706 and remote printer icon 708 that are disabled. In one embodiment of the invention, all remote device icons and menu options are advantageously disabled to prevent output to a remote location. In one embodiment of the invention, disabled icons can be selected. However, a user alert will be generated if a request to output to a remote device is filtered to notify the user that they are potentially outputting information to a remote location.

Embodiments of the present invention include a system and method for detecting accidental data output to remote devices is disclosed. Embodiments of the present invention include a method for outputting information comprising the steps of accessing information associated with an application accessible from a first location and requesting output of the information to an electronic device. The method further includes determining a location of the electronic device, determining if the first location is remote to the location of the electronic device, and if the first location is remote to the location of the electronic device, preventing output of the information to the electronic device.

It is appreciated that the present invention can be used to filter all accidental information outputs to electronic devices. In addition to outputting information to a remote device, embodiments of the present invention can be used to prevent, for example, printing to a color printer when a black and white printer was intended. Furthermore, embodiments of the present invention can filter accidental outputting of information to a local electronic device. The filtering of the present invention can be used to filter any accidental output of information. Additional embodiments include printing to an incorrect printer, printing to an incorrect paper size, saving a file to the incorrect location, etc.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for outputting information comprising:
   accessing, by a computer system, information associated with an application running on said computer system;
   receiving, by said computer system, a request to output said information to an electronic device;
   determining, by said computer system, a geographic location of said computer system;
   determining, by said computer system, a geographic location of said electronic device;
   determining, by said computer system, if said geographic location of said computer system is remote to said geographic location of said electronic device; and
   if said geographic location of said computer system is remote to said geographic location of said electronic device, preventing, by said computer system, output of said information to said electronic device.

2. The method as recited in claim 1 wherein said electronic device is a printing device and said information represents an electronic representation of a document.

3. The method as recited in claim 2 further comprising:
   determining a default printer associated with said application; and
   if said default printer corresponds to a printer that is remote to said geographic location of said computer system, automatically modifying said default printer to correspond to a printer that is local to said geographic location of said computer system.

4. The method as recited in claim 1 wherein said preventing output comprises rendering a user alert when said geographic location of said computer system is remote to said geographic location of said electronic device.

5. The method as recited in claim 4 further comprising allowing output of said information to said electronic device in response to a user validation.

6. The method as recited in claim 1 wherein said preventing output comprises disabling a graphical icon or menu option on said computer system that is associated with said electronic device.

7. The method as recited in claim 1 further comprising determining said geographic location of said computer system and said geographic location of said electronic device based on global positioning satellite (GPS) data.

8. The method as recited in claim 1 further comprising:
determining if said information is sensitive; and
wherein said preventing output only prevents output if said information is sensitive.

9. The method as recited in claim 1 further comprising determining said geographic location of said computer system and said geographic location of said electronic device from network topography data.

10. A system comprising:
a processing component configured to:
receive a request to output information to an electronic device;
determine a geographic location of said system;
determine a geographic location of said electronic device;
determine if said geographic location of said system is remote to said geographic location of said electronic device; and
if said geographic location of said system is remote to said geographic location of said electronic device, prevent output of said information to said electronic device.

11. The system as recited in claim 10 wherein said electronic device is a printing device.

12. The system as recited in claim 11 wherein said system further comprises a display screen for displaying a print icon associated with said printing device, and wherein preventing output of said information comprises disabling said print icon.

13. The system as recited in claim 10 wherein the processing component is further configured to:
determine a default output device setting; and
if said default output device setting corresponds to an output device that is remote to said geographic location of said system, automatically modify said default output device setting to correspond to an output device that is local to said geographic location of said system.

14. The system as recited in claim 13 wherein said geographic location of said system and said geographic location of said electronic device are determined using global positioning satellite (GPS) data.

15. The system as recited in claim 13 wherein said geographic location of said system and said geographic location of said electronic device are determined using network topography data.

16. The system as recited in claim 10 wherein said electronic device is a portable electronic device.

17. The system as recited in claim 10 wherein preventing output of said information comprises generating an alert.

18. A method for printing comprising:
receiving, by a computer system, a request to output a data file to a printer;
determining, by said computer system, a geographic location of said computer system;
determining, by said computer system, a geographic location of said printer;
determining, by said computer system, if said geographic location of said computer system is remote to said geographic location of said printer; and
filtering, by said computer system, said request if said geographic location of said computer system is remote to said geographic location of said printer.

19. The method as recited in claim 18 wherein said filtering comprises disabling a print icon or menu option associated with said printer as displayed on said computer system.

20. The method as recited in claim 18 wherein said filtering comprises automatically modifying default print options of said computer system such that said request is routed to a second printer local to said geographic location of said computer system.

21. The method as recited in claim 18 wherein determining said geographic location of said computer system and said printer comprises accessing global positioning satellite (GPS) data.

22. The method as recited in claim 18 wherein determining said geographic location of said computer system and said printer comprises accessing network topography data.

23. The method as recited in claim 18 further comprising generating an alert when said geographic location of said computer system is remote to said geographic location of said printer and allowing said request to said printer in response to a user validation.

24. The method as recited in claim 18 further comprising:
determining if said data file is sensitive; and
wherein said filtering prevents output of said data file if said data file is sensitive.

25. A computer-readable storage medium storing instructions executable by a processor of a computer system, the instructions comprising:
instructions that cause the processor to access information associated with an application running on the computer system;
instructions that cause the processor to receive a request to output the information to an electronic device;
instructions that cause the processor to determine a geographic location of the computer system;
instructions that cause the processor to determine a geographic location of the electronic device;
instructions that cause the processor to determine if the geographic location of the computer system is remote from the geographic location of the electronic device; and
instructions that cause the processor to prevent output of the information to the electronic device if the geographic location of the computer system is remote from the geographic location of the electronic device.

* * * * *

UNITED STATES PATENT AND TRADEMARK OFFICE
CERTIFICATE OF CORRECTION

PATENT NO.       : 7,660,004 B2
APPLICATION NO.  : 10/780367
DATED            : February 9, 2010
INVENTOR(S)      : Anuj Jain It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1708 days.

Signed and Sealed this

Thirtieth Day of November, 2010

David J. Kappos
*Director of the United States Patent and Trademark Office*